United States Patent Office 3,785,967
Patented Jan. 15, 1974

3,785,967
HYDRODESULFURIZATION WITH EXPANDED OR MOVING BED OF CATALYST HAVING SPECIFIC PARTICLE DIAMETER AND SPECIFIC PORE DIAMETER
Jakob van Klinken, Amsterdam, Netherlands, assignor to Shell Oil Company, New York, N.Y.
No Drawing. Filed June 30, 1971, Ser. No. 158,584
Claims priority, application Netherlands, July 14, 1970, 7010428
Int. Cl. C10g 23/02
U.S. Cl. 208—216                                    9 Claims

ABSTRACT OF THE DISCLOSURE

A process for catalytically hydrodesulfurizing residual hydrocarbon oils having a total vanadium and nickel content above 30 p.p.m.w. and a $C_5$-asphaltene content above 0.5% wt., with catalyst replenishment during operation, which includes passing the residual oil together with hydrogen through catalyst particles in the form of a suspension or expanded bed having hydrodesulfurization activity at hydrodesulfurization reaction conditions, the catalyst particles in said bed having a pore volume above 0.3 ml./g., less than 10% of the pore volume being present in pores having a diameter above 1000 A., and having a specific pore diameter, expressed in A., of from $45 \times d^{0.6}$ to $140 \times d^{0.6}$ where $d$ is the specific particle diameter in mm.

BACKGROUND OF THE INVENTION

The invention relates to a process for catalytically hydrodesulfurizing residual hydrocarbon oils or oil fractions, in which during the operation continuous or periodic replenishment of the catalyst present in the desulfurization reactor is carried out.

Residual hydrocarbon oils generally contain a considerable quantity of sulfur compounds. When these oils are used as fuel, the sulfur present in the sulfur compounds is converted into sulfur dioxide which is discharged to the atmosphere. In order to restrict air pollution as much as possible in the combustion of these oils, it is desirable for the sulfur content to be reduced. The sulfur content of the hydrocarbon oils can be reduced by the catalytic hydrodesulfurization of the oils. For this purpose processes can be used in which during the operation continuous or periodic replenishment of the catalyst present in the desulfurization reactor takes place, or processes in which during operation no continuous or periodic replenishment of the catalyst present in the desulfurization reactor takes place. For the sake of brevity the former processes will be referred to as "catalytic hydrodesulfurization with catalyst replenishment" and the latter processes as "catalytic hydrodesulfurization without catalyst replenishment."

The catalytic hydrodesulfurization of residual hydrocarbon oils or oil fractions involves certain problems which do not arise when this process is used for hydrocarbon oil distillates. These problems result from the fact that most residual hydrocarbon oils, such as residues obtained in the distillation of crude oils under atmospheric or reduced pressure, comprise high-molecular weight non-distillable compounds, such as asphaltenes, resins, polyaromatics and metal compounds. When the residual hydrocarbon oils are exposed to high temperatures, as is usual in hydrodesulfurization, the asphaltenes which are colloidally dispersed therein tend to flocculate and deposit on the catalyst particles. The flocculation of the asphaltenes during catalytic hydrodesulfurization is further promoted by the fact that the aromaticity of the liquid phase in which the asphaltenes are colloidally dispersed falls as a result of hydrogenation and hydrocracking.

The principal high-molecular weight metal compounds present in residual hydrocarbon oils are nickel and vanadium compounds. The metal compounds are present in the oils as, among others, organometallic complexes, such as metalloporphyrines, and are for a considerable part bound to the asphaltenes. Like the asphaltenes, the high-molecular weight metal compounds tend to deposit on the catalyst particles during hydrodesulfurization. A portion of the high-molecular weight compounds which deposit on the catalyst particles are converted into coke. As a result of the increasing concentration of heavy metals and coke on the active sites of the catalyst, a very rapid deactivation of the catalyst occurs in the catalytic hydrodesulfurization of residual hydrocarbon oils. As the activity of the catalyst decreases, a higher temperature must be applied in order to maintain the desired degree of desulfurization. In practice, a procedure that is often followed is to start the process at the lowest possible temperature at which the desired degree of desulfurization can just be obtained. Although this procedure results in a product having a constant sulfur content, other properties of the product, such as viscosity, change continuously as a result of the rising temperature. As higher temperatures are used hydrocracking reactions become more prevalent and the oil to be desulfurized is increasingly converted to gas and low-boiling fractions, such as gasoline, naphtha, kerosene and the like. Consequently, a fuel oil is obtained the quality of which is not constant. Moreover, catalyst life is relatively short in this mode of operation, since the deposition of asphaltenes and other high-molecular weight compounds on the catalyst is highest at the low temperatures which are used at the beginning of the process.

When a desulfurization process is operated at the highest possible temperature excessive catalyst activity results in too high a degree of desulfurization, and the fuel oil yield is poor as a result of drastic hydrocracking. Moreover, such a process is very difficult to control, since hydrogen consumption is not constant because the degree of desulfurization falls as catalyst activity decreases during operation.

To prolong catalyst life removing the asphaltenes from the feed before desulfurizing and subsequently remixing the separated asphaltenes with the desulfurized product has been considered. Apart from the fact that this mode of operation requires an additional process step, namely de-asphaltenizing, this method of desulfurization involves another drawback, which is particularly important if a product with a very low sulfur content is desired. Since asphaltenes generally have a fairly high sulfur content, mixing of the desulfurized product with the separated asphaltenes may result in a final product having an unacceptably high sulfur content. If the separated asphaltenes are only partly mixed with the desulfurized product or if mixing is entirely omitted to avoid the drawback, the final product yield may consequently be so adversely affected that the process is no longer economic. Therefore, preference is given to a method of catalytic hydrodesulfurization in which the total feed, i.e., including the asphaltenes, is processed. However, this embodiment of the process requires catalysts having greater resistance to deactivation than those which are now generally recommended for this purpose.

THE INVENTION

An investigation into the catalytic hydrodesulfurization of residual hydrocarbon oils with catalyst replenishment has revealed that optimum catalysts for this purpose must comply with a number of specific requirements with regard to their particle diameter and porosity. Moreover, the total vanadium and nickel content and the $C_5$-asphaltene content of the hydrocarbon oil to be desulfurized play an important part. An optimum catalyst for the hydrodesulfurization of residual hydrocarbon oils with catalyst replenishment is a catalyst which shows as high as possible a degree of equilibrium activity during its residence time in the reactor.

It has been found that for the catalytic hydrodesulfurization with catalyst replenishment of residual hydrocarbon oils having a total vanadium and nickel content above 30 p.p.m.w. (parts per million weight) and a $C_5$-asphaltene content above 0.5% by weight, the above specific requirements with respect to particle diameter and porosity of the catalyst are as follows. The catalyst particles must have a pore volume above 0.30 ml./g., and less than 10% of this pore volume must be present in pores having a diameter above 1000 A. Further, the catalyst particles must have a specific pore diameter $(p)$, expressed in A., of from $45 \times d^{0.6}$ to $140 \times d^{0.6}$, in which $d$ is the specific diameter in mm. The above-mentioned values $d$ and $p$ have been defined on the basis of the determination methods below.

After a complete sieve analysis of a catalyst sample has been carried out, $d$ is read from a graph in which for every successive sieve fraction the percentage by weight, based on the total weight of the catalyst sample, has been cumulatively plotted as a function of the linear average particle diameter of the relevant sieve fraction; $d$ is the particle diameter corresponding with 50% of the total weight.

After a complete determination of the pore radius distribution of a catalyst sample, $p$ is read from a graph in which for the pore diameter range of 0–1000 A., for every successive pore volume increment smaller than 20% of the pore volume, the quotient of the pore volume increment and the corresponding pore diameter interval has been cumulatively plotted as a function of the linear average pore diameter over the relevant pore diameter interval; $p$ is the pore diameter corresponding with 50% of the total quotient at 1000 A.

For determining the pore radius distribution of the catalyst nitrogen adsorption/desorption combined with porosity determination by mercury displacement is very suitable.

The invention therefore relates to a process for the catalytic hydrodesulfurization of residual hydrocarbon oils or oil fractions having a total vanadium and nickel content above 30 p.p.m.w. and a $C_5$-asphaltene content above 0.5% by weight, in which during the operation the catalyst present in the desulfurization reactor is continuously or periodically replenished, in which process a catalyst is used, the particles of which have a pore volume above 0.30 ml./g., less than 10% of which pore volume being present in pores with a diameter above 1000 A. and in which the catalyst particles have a specific pore diameter $(p)$, expressed in A., of from $45 \times d^{0.6}$ to $140 \times d^{0.6}$, in which $d$ is the specific particle diameter and in which $d$ and $p$ have been defined on the basis of their determination method as described above.

The relationship found between specific particle diameter and specific pore diameter makes it possible at a certain specific particle diameter of the catalyst particles to determine the range within which the specific pore diameter of the catalyst particles must be selected to obtain an optimum catalyst. Conversely, it is also possible to derive from the relationship found the range within which the specific particle diameter of catalyst particles having a certain specific pore diameter must be selected to obtain an optimum catalyst. The most suitable values for the specific pore diameter and the specific particle diameter respectively within the ranges found are mainly determined by the composition of the hdyrocarbon oil to be desulfurized.

If in the application of the above relationship for determining the range of the optimum specific pore diameter and optimum specific particle diameter respectively, values are substituted for the particle diameter respectively, values are substituted for the particle diameter and pore diameter and pore diameter respectively, which values have been determined by a method other than that specified above for the specific particle diameter and specific pore diameter respectively (for example, the particle diameter calculated as linear average or the pore diameter calculated as the quotient of four times the pore volume and the surface), completely different results may be obtained.

The catalytic hydrodesulfurization of residual hydrocarbon oils with catalyst replenishment may be carried out in various ways. Hydrogen may be passed with or without the hydrocarbon oil to be desulfurized in an upward direction through a vertically disposed reactor containing a suspension of catalyst in oil. The hydrogen may be introduced into the bottom end of the reactor at such a rate as to cause recycling of the oil, together with the catalyst suspended therein. The process may also be carried out with the aid of a moving catalyst bed which moves in a vertical direction through the reactor during the operation.

In the catalytic hydrodesulfurization of residual hydrocarbon oils with catalyst replenishment, use is generally made of catalyst particles having a specific particle diameter of 0.05–2.5 mm. If the desulfurization is performed with the use of the catalyst in the form of a suspension in an expanded bed, use is preferably made of catalyst particles with a specific particle diameter of 0.05–1.0 mm. If the desulfurization is carried out with the use of the catalyst in the form of a moving bed, catalyst particles with a specific particle diameter of 1.0–2.0 mm. are preferably used.

As already stated, the catalyst particles should have a specific pore diameter of from $45 \times d^{0.6}$ to $140 \times d^{0.6}$. If catalyst particles with a specific particle diameter of from 0.05 to 1.0 mm. are used, particles having a specific pore diameter of from $45 \times d^{0.6}$ to $130 \times d^{0.6}$ are preferred; if catalyst particles with a specific particle diameter of from 1.0 to 2.0 mm. are employed preference is given to particles having a specific pore diameter of from $45 \times d^{0.6}$ to $120 \times d^{0.4}$. The catalyst particles preferably have a pore volume above 0.40 ml./g., in particular a pore volume above 0.50 ml./g.

In the preparation of optimum desulfurization catalysts according to the invention starting from a certain catalyst or catalyst carrier material the following problem may arise. The optimum specific particle diameter corresponding with the specific pore diameter of the material from which the catalyst must be prepared may be so small that difficulties arise when such small catalyst particles are used for catalytic hydrodesulfurization. In this case it is preferred that agglomerates be formed from the small particles the specific particle diameter of which is optimum in relation to the specific pore diameter, which agglomerates are composed of a number of the small particles, more than 10% of the pore volume of these agglomerates being present in pores with a diameter above 1000 A. It is preferred that from the small particles agglomerates be formed having more than 25% of its pore volume in pores with a diameter above 1000 A. The use of these porous catalyst agglomerates in the hydrodesulfurization of residual hydrocarbon oils offers the same advantages as the use of the small optimum catalyst particles without the drawbacks inherent in the use of these small catalyst particles being encountered. The porous catalyst or catalyst carrier agglomerates may be prepared from small optimum particles by bonding them with or without the use of a binding agent in the presence of a material which is incorporated in the agglomerates and subsequently removed therefrom by evaporation, combustion, solution, leaching or otherwise, leaving pores with a diameter above 1000 A. in the agglomerates. Suitable compounds for this purpose are cellulose-containing materials, polymers and compounds soluble in organic or inorganic solvents.

Catalysts suitable for the hydrodesulfurization of residual hydrocarbon oils according to the invention generally possess a chemical composition substantially corresponding with that of the known desulfurization catalysts. Preference is given to sulfur-resistant catalyst containing one or more metals of Groups VI–B, VII–B, and/or VIII, their sulfides and/or oxides, supported on an inorganic oxide of the elements of Group II, III or IV, or mixtures of the said oxides. Examples of suitable catalysts are catalysts containing nickel/tungsten, nickel/molybdenum, cobalt/molybdenum or nickel/cobalt/molybdenum supported on silica, alumina, magnesia, zirconia, thoria boria, hafnia, silica-alumina, silica-magnesia or alumina-magnesia as carriers.

The catalysts may also contain additives, such as phosphates or phosphorus and/or halogens, such as fluorine and chlorine. The phosphates may be present in a quantity of 10–40% by weight, more particularly of 15–30% by weight, based on the total catalyst weight, the halogens and phosphorus generally being used in a quantity smaller than 10% by weight.

Although in principle the metal components may be present in the catalyst in any quantity, preference is given to catalysts containing 2–35% by weight and more, particularly 5–25% by weight, of metal. The Group VIII metals are generally used in quantities of from 0.1 to 10% by weight and the Group VI–B metals in a quantity of from 2.5 to 30% by weight. The atomic ratio of the said Group VIII and Group VI–B metals may vary widely, but is preferably between 0.1 and 5. Alumina and silica-alumina are preferred as carrier materials for the present desulfurization catalysts.

The reaction conditions in hydrodesulfurization according to the invention may vary widely dependent on the nature of the residual hydrocarbon oil to be desulfurized. Desulfurization is preferably carried out at a temperature of 350–375° C., more particularly at a temperature of 385–445° C. The total pressure is preferably 50–350 kg./cm.$^2$, more in particular 75–225 kg./cm.$^2$. The space velocity is preferably 0.1–10 parts by weight of fresh feed per part by volume of catalyst per hour and more in particular 0.5–5 parts by weight of fresh feed per part by volume of catalyst per hour.

Examples of feeds to which the desulfurization process according to the invention may be applied are crude oils and residues obtained by distilling crude oils at atmospheric and reduced pressure. It is preferable that the feed to be desulfurized should contain less than 50 p.p.m. by weight and in particular less than 25 p.p.m. by weight of alkali metal and/or alkaline earth metal. If the alkali and/or alkaline earth metal content in the feed is excessive, it may be reduced, for example, by washing the feed.

The invention will now be illustrated with reference to the following examples.

EXAMPLE I

A residual hydrocarbon oil having a total nickel and vanadium content of 245 p.p.m.w., a C$_5$-asphaltene content of 7.2% by weight and a sulfur content of 2.1% by weight, which oil had been obtained as residue in the atmospheric distillation of a Caribbean crude oil was catalystically hydrodesulfurized with catalyst replenishment and with the use of different alumina and silica-alumina based catalysts. The oil together with hydrogen was passed through a stirred reactor containing the oil saturated with hydrogen and the catalyst at a temperature of 420° C., a total pressure of 150 kg./cm.$^2$, an exit gas rate of 250 Nl./kg. of fresh feed and a space velocity of 4.35 kg. of oil/ kg. of catalyst per hour.

The alumina-based catalysts contained 10.9 g. of molybdenum and 4.3 g. of nickel or cobalt supported on 100 g. of alumina. The silica-alumina based catalysts contained 16 g. of molybdenum and 2 g. of nickel supported on 100 g. of carrier consisting of 87 g. of silica and 13 g. of alumina. The metals had been deposited on the carriers by co-impregnation with a mono-ethanol-amine solution containing ammonium heptamolybdate and nickel formate or cobalt acetate. The silica-alumina carriers had been prepared by calcining a silica-alumina hydrogel and neutralizing the xerogel thus obtained with ammonia.

The results of the desulfurization experiments are shown in Table A.

In this table $k_e$ is the reaction rate constant for desulfurization in the stationary state in a reactor wherein continuous catalyst replenishment is effected at a rate of 0.3 kg. of catalyst/ton of fresh feed.

TABLE A

| Catalyst number | Catalyst | Total pore volume, ml./g. | Percent of the pore volume present in pores with a diameter above 1,000 A. | Specific pore diameter, A. | Specific particle diameter, mm. | Reaction rate $k_e$, kg. of feed/kg. of catalyst hour (per cent of S)$^{1/2}$ |
|---|---|---|---|---|---|---|
| 1 | Ni/Mo/Al$_2$O$_3$ | 1.09 | 3.7 | 88 | 1.5 | 2.7 |
| 2 | Ni/Mo/Al$_2$O$_3$ | 1.09 | 3.7 | 88 | 0.76 | 2.6 |
| 3 | Ni/Mo/Al$_2$O$_3$ | 0.98 | 3.6 | 228 | 1.5 | 1.9 |
| 4 | Ni/Mo/Al$_2$O$_3$ | 0.78 | 22.2 | 76 | 1.5 | 1.0 |
| 5 | Ni/Mo/Al$_2$O$_3$ | 0.63 | 11.1 | 136 | 0.9 | 0.7 |
| 8 | Co/Mo/Al$_2$O$_3$ | 0.51 | 5.9 | 46 | 1.5 | 1.3 |
| 9 | Co/Mo/Al$_2$O$_3$ | 0.51 | 5.9 | 46 | 0.76 | 4.1 |
| 10 | Co/Mo/Al$_3$O$_3$ | 0.51 | 5.9 | 46 | 0.2 | 3.4 |
| 11 | Ni/Mo/SiO$_2$/Al$_2$O$_3$ | 1.08 | 4.6 | 100 | 0.76 | 3.0 |
| 12 | Co/Mo/Al$_2$O$_3$ | 0.51 | 5.9 | 46 | 0.07 | 1.5 |
| 13 | Ni/Mo/SiO$_2$/Al$_2$O$_3$ | 0.95 | <3 | 78 | 0.5 | 3.6 |
| 14 | Ni/Mo/SiO$_2$/Al$_2$O$_3$ | 0.95 | <3 | 78 | 0.76 | 3.0 |
| 15 | Ni/Mo/SiO$_2$/Al$_2$O$_3$ | 0.95 | <3 | 78 | 1.5 | 2.3 |

The criterion for an optimum catalyst for the hydrodesulfurization, with catalyst replenishment, of residual hydrocarbon oils having a total vanadium and nickel content above 30 p.p.m.w. and a C$_5$-asphaltene content above 0.5% by weight is that the equilibrium activity of the catalyst in the stationary state ($k_e$) must exceed 2.0.

The catalysts 1, 2, 9, 10, 11, 13, 14 and 15 (with $k_e>2.0$) are catalysts according to the invention for the catalytic hydrodesulfurization with catalyst replenishment. They comply with the relationship $45 \times d^{0.6} < p < 140 \times d^{0.6}$. The catalysts 3, 4, 5, 8 and 12 (with $k_e < 2.0$) are less suitable for the catalytic hydrodesulfurization with catalyst replenishment. The catalysts 3, 5, 8 and 12 do not comply with the relationship $45 \times d^{0.6} < p < 140 \times d^{0.6}$. Moreover, more than 10% of the pore volume of catalyst 5 is present in pores having a diameter above 1000 A. Catalyst 4 does comply with the relationship, but more than 10% of the total pore volume in this catalyst is present in pores having a diameter above 1000 A.

Catalyst 3 which is less suitable for the catalytic hydrodesulfurization with catalyst replenishment has proved very suitable for the catalytic hydrodesulfurization without catalyst replenishment. Conversely, catalysts 1, 9 and 15 which are very suitable for the catalytic hydrodesulfurization with catalyst replenishment, have proved less suitable for catalytic hydrodesulfurization without catalyst replenishment.

EXAMPLE II

By means of nitrogen adsorption and porosity determination by mercury displacement complete pore radius distribution of the catalysts 4 and 5 of Example I were determined. Tables B and C show the percentage of the pore volume present in the pores with a given pore radius.

TABLE B

Catalyst 4

| Pore radius, A.: | Percent of the pore volume |
|---|---|
| 0–20 | 19.2 |
| 20–30 | 7.0 |
| 30–40 | 6.4 |
| 40–50 | 5.7 |
| 50–60 | 5.7 |
| 60–70 | 5.1 |
| 70–80 | 5.1 |
| 80–100 | 7.0 |
| 100–200 | 12.8 |
| 200–500 | 3.8 |
| >500 | 22.2 |

Pore volume: 0.78 ml./g.
Surface: 238 m.²/g.

TABLE C

Catalyst 5

| Pore radius, A.: | Percent of the pore volume |
|---|---|
| 0–10 | 6.4 |
| 10–20 | 6.4 |
| 20–30 | 7.2 |
| 30–40 | 5.6 |
| 40–50 | 3.1 |
| 50–60 | 3.1 |
| 60–70 | 7.9 |
| 70–80 | 12.7 |
| 80–90 | 12.7 |
| 90–100 | 11.1 |
| 100–150 | 7.9 |
| 150–200 | 1.6 |
| 200–500 | 3.2 |
| >500 | 11.1 |

Pore volume: 0.63 ml./g.
Surface: 133 m.²/g.

Of the catalysts 4 and 5 the pore diameters were determined by three different methods, each used as such in practice.

Method 1: Calculated by means of the formula $$\text{Pore diameter} = \frac{4 \times \text{pore volume}}{\text{Surface}} \times 10^4$$

Method 2: Read from a graph composed by means of a complete pore radius distribution and in which for the pore diameter range of from 0 to 1000 A., for each pore volume increment smaller than 20% of the pore volume, the quotient of the pore volume increment and the corresponding pore diameter interval has been plotted as a function of the linear average pore diameter over the relevant pore diameter interval; the pore diameter is read off at the point where the curve reaches a maximum.

Method 3: Read from a graph composed by means of a complete pore radius distribution and in which for the pore diameter range from 0 to 1000 A., for each pore volume increment smaller than 20% of the pore volume, the quotient of the pore volume increment and the corresponding pore diameter interval has been cumulatively plotted as a function of the linear average pore diameter over the relevant pore diameter interval; the pore diameter is read off at the point corresponding with 50% of the total quotient at 1000 A.

For catalyst 4 the following pore diameter values are found by the different methods.

By Method 1: 131 A.
By Method 2: Undeterminable, since there is no distinct maximum in the curve.
By Method 3: 76 A.

For catalyst 5 the following pore diameter values are found by the different methods.

By Method 1: 189 A.
By Method 2: 160 A.
By Method 3: 136 A.

It is seen from this example that the different methods for determining the pore diameter of the catalyst lead to widely varying results. For determining the specific pore diameter ($p$) according to the invention Method 3 is used.

EXAMPLE III

A complete sieve analysis was carried out of a Ni/Mo/Al$_2$O$_3$ catalyst having a particle diameter between 0.115 and 1.10. The results of this sieve analysis are shown in Table D.

TABLE D

| Sieve No. (US Mesh) | Particle diameter, mm. | Percent by weight | Average particle size, mm. | Cumulative percent by weight |
|---|---|---|---|---|
| 16–18 | 1.00–1.19 | 1.0 | 1.10 | 100.0 |
| 18–20 | 0.84–1.00 | 2.3 | 0.92 | 99.0 |
| 20–25 | 0.71–0.84 | 3.5 | 0.77 | 96.7 |
| 25–30 | 0.59–0.71 | 5.2 | 0.65 | 93.2 |
| 30–35 | 0.50–0.59 | 5.5 | 0.55 | 88.0 |
| 35–40 | 0.42–0.50 | 6.6 | 0.46 | 82.5 |
| 40–45 | 0.35–0.42 | 8.1 | 0.38 | 75.9 |
| 45–50 | 0.297–0.35 | 7.1 | 0.32 | 67.8 |
| 50–60 | 0.250–0.297 | 9.3 | 0.27 | 60.7 |
| 60–70 | 0.210–0.250 | 8.9 | 0.23 | 51.4 |
| 70–80 | 0.177–0.210 | 8.5 | 0.19 | 42.5 |
| 80–100 | 0.149–0.177 | 9.9 | 0.165 | 34.0 |
| 100–120 | 0.125–0.149 | 10.8 | 0.13 | 24.1 |
| 120–140 | 0.105–0.125 | 13.3 | 0.115 | 13.3 |

The particle diameter of this catalyst was determined by two different methods which are both used in practice.

Method 1: Calculated as linear average by means of the formula $$\text{Particle diameter} = \frac{d_1 + d_2}{2}$$

in which $d_1$ and $d_2$ represent the particle diameter of the largest and the smallest particle, respectively.

Method 2: Read from a graph composed by means of a complete sieve analysis and in which for every successive sieve fraction the percentage by weight, based on the total weight of the catalyst sample, has been plotted cumulatively as a function of the linear average diameter of the relevant sieve fraction; the particle diameter is read off at the point corresponding with 50% of the total weight.

For this catalyst the following particle diameter values are found by the different methods.

By Method 1: 0.61 mm.
By Method 2: 0.225 mm.

It is seen from this example that the different methods for determining the particle diameter of the catalyst lead to widely varying results. For determining the specific particle diameter ($d$) according to the invention Method 2 is used.

What is claimed is:

1. In a slurry-phase process for catalytically hydrodesulfurizing residual hydrocarbon oil having a total vanadium and nickel content above 30 p.p.m.w. and a C$_5$-asphaltene content above 0.5% wt., said process operating with catalyst replenishment, in which said oil passes together with hydrogen under hydrodesulfurization reaction conditions in an upward direction through a vertically disposed expanded or moving bed of catalyst particles comprising 0.1–

10% wt. of one or more Group VIII metals and 2.5–30% wt. of one or more Group VI–B metals supported on an alumina or silica-alumina carrier, and wherein the liquid and gas velocities are such that the catalyst bed expands and occupies a volume which is at least 10% larger than the volume of said catalyst bed when it is not expanded, the improvement which comprises providing said catalyst particles having a pore volume above 0.30 ml./g., more than 90% of said pore volume being present in pores having a diameter ranging from 0–1000 angstroms and less than 10% of said pore volume being present in pores having a diameter above 1000 angstroms, said particles having a specific particle diameter expressed as $d$ and ranging from 0.05 to 2.55 mm. and a specific pore diameter of from $45 \times d^{0.6}$ to $140 \times d^{0.6}$ A.

2. The process of claim 1 wherein the catalyst particles have a pore volume above 0.50 ml./g.

3. The process of claim 1 wherein the reaction conditions include a temperature of 350°–475° C., a total pressure of 50–350 kg/cm² and a space velocity of 0.1–10 parts by weight of fresh feed per part by volume of catalyst per hour.

4. The process of claim 1 wherein the reaction conditions include a temperature of 385° C.–445° C., a total pressure of 75–225 kg./cm.² and a space velocity of 0.5–5 parts by weight of fresh feed per part by volume of catalyst per hour.

5. The process of claim 1 wherein the hydrodesulfurizing is performed with the catalyst particles disposed in a suspension in an expanded bed, said particles having a specific particle diameter expressed as $d$ and ranging from 0.05 to 1.0 mm., and a specific pore diameter of from $45 \times d^{0.6}$ to $130 \times d^{0.6}$ A.

6. The process of claim 1 wherein the hydrodesulfurizing is performed with the catalyst particles disposed in a moving bed, said particles having a specific particle diameter expressed as $d$ and ranging from 1.0 to 2.0 mm., and a specific pore diameter of from $45 \times d^{0.6}$ to $120 \times d^{0.4}$ A.

7. In a slurry-phase process for catalytically hydrodesulfurizing residual hydrocarbon oil having a total vanadium and nickel content above 30 p.p.m.w. and a $C_5$-asphaltene content above 0.5% wt., said process operating with catalyst replenishment, in which said residual oil passes together with hydrogen under hydrodesulfurization reaction conditions in an upward direction through a vertically disposed expanded or moving bed of catalyst particles comprising a hydrogenation component consisting of 0.1–10% wt. selected from nickel and cobalt and 2.5–30% wt. selected from molybdenum and tungsten, said component being in the form of metals, oxides or sulfides supported on an alumina or silica-alumina carrier, and wherein the liquid and gas velocities are such that the catalyst bed expands and occupies a volume which is at least 10% larger than the volume of said catalyst bed when it is not expanded, the improvement which comprises providing said catalyst particles having a pore volume above 0.50 ml./g., more than 90% of said pore volume being present in pores having a diameter ranging from 0–1000 angstroms and less than 10% of said pore volume being present in pores having a diameter above 1000 angstroms, said particles having a specific particle diameter expressed as $d$ and ranging from 0.05 to 2.5 mm., and a specific pore diameter of from $45 \times d^{0.6}$ to $140 \times d^{0.6}$ A.

8. The process of claim 7 wherein the hydrodesulfurizing is performed with the catalyst particles disposed in a suspension in an expanded bed, said particles having a specific particle diameter expressed as $d$ and ranging from 0.05 to 1.0 mm, and a specific pore diameter of from $45 \times d^{0.6}$ to $130 \times d^{0.6}$ A.

9. The process of claim 7 wherein the hydrodesulfurizing is performed with the catalyst particles disposed in a moving bed, said particles having a specific particle diameter expressed as $d$ and ranging from 1.0 to 2.0 mm., and a specific pore diameter of from $45 \times d^{0.6}$ to $120 \times d^{0.4}$ A.

References Cited
UNITED STATES PATENTS

| | | | |
|---|---|---|---|
| 3,183,080 | 5/1965 | Schuman et al. | 208—216 |
| 3,553,105 | 1/1971 | Layng et al. | 208—213 |
| 3,622,265 | 11/1971 | Weber et al. | 208—213 |
| 3,639,230 | 1/1972 | Oguchi et al. | 208—213 |
| 3,622,500 | 11/1971 | Albert et al. | 208—217 |
| 3,169,918 | 2/1965 | Gleim | 208—216 |
| 3,383,301 | 5/1968 | Beauther et al. | 208—217 |
| 3,425,934 | 2/1969 | Jacobson et al. | 208—217 |
| 3,509,044 | 4/1970 | Adams et al. | 208—217 |

DELBERT E. GANTZ, Primary Examiner

G. J. CRASANAKIS, Assistant Examiner

U.S. Cl. X.R.

208—213

Disclaimer

3,785,967.—*Jakob van Klinken,* Amsterdam, Netherlands. HYDRODE-SULFURIZATION WITH EXPANDED OR MOVING BED OF CATALYST HAVING SPECIFIC PARTICLE DIAMETER AND SPECIFIC PORE DIAMETER. Patent dated Jan. 15, 1974. Disclaimer filed Oct. 4, 1982, by the assignee, *Shell Oil Co.*

Hereby enters this disclaimer to all of the claims of said patent.
[*Official Gazette December 28, 1982.*]